US012680008B2

(12) United States Patent (10) Patent No.: US 12,680,008 B2
Kodama (45) Date of Patent: Jul. 14, 2026

(54) COOLANT COMPOSITION

(71) Applicant: TOYOTA JIDOSHA KABUSHIKI KAISHA, Toyota (JP)

(72) Inventor: Yasuaki Kodama, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 527 days.

(21) Appl. No.: 18/219,389

(22) Filed: Jul. 7, 2023

(65) Prior Publication Data

US 2024/0093079 A1 Mar. 21, 2024

(30) Foreign Application Priority Data

Sep. 16, 2022 (JP) .................................. 2022-148580

(51) Int. Cl.
*C09K 5/06* (2006.01)

(52) U.S. Cl.
CPC .................................... *C09K 5/066* (2013.01)

(58) Field of Classification Search
CPC . C09K 5/066; C09K 5/02; C09K 3/18; C10M 173/00; C10M 145/00; C10M 145/38
See application file for complete search history.

(56) References Cited

U.S. PATENT DOCUMENTS

| | | | |
|---|---|---|---|
| 4,518,512 A | 5/1985 | Kanamori | |
| 8,507,414 B2 * | 8/2013 | Takahama ............ | C10M 173/02 |
| | | | 508/517 |
| 2012/0270129 A1 * | 10/2012 | Marinho ............ | B01D 19/0409 |
| | | | 136/246 |
| 2013/0200299 A1 * | 8/2013 | Mazyar .................... | C09K 5/14 |
| | | | 977/734 |
| 2017/0369814 A1 * | 12/2017 | Obrecht ............... | C10M 161/00 |
| 2018/0100118 A1 * | 4/2018 | Flores-Torres ....... | C10M 169/04 |

FOREIGN PATENT DOCUMENTS

| | | | | |
|---|---|---|---|---|
| EP | 261546 A2 * | 3/1988 | ............... | B23H 1/08 |
| JP | S59-124995 A | 7/1984 | | |
| JP | H10-140176 A | 5/1998 | | |
| JP | 2007-146043 A | 6/2007 | | |
| JP | 2008105172 A * | 5/2008 | ............... | B23H 1/08 |
| JP | 2021-94489 A | 6/2021 | | |

OTHER PUBLICATIONS

Clarivate Analytics machine translation for JP 2008105172A to Kitamura, published May 8, 2008 (Year: 2008).*

* cited by examiner

*Primary Examiner* — Jane L Stanley
(74) *Attorney, Agent, or Firm* — Oliff PLC

(57) ABSTRACT

A coolant composition includes a mineral oil or a synthetic oil and a surfactant, in which a conductivity of the coolant composition is lower than 0.1 μS/cm, and the surfactant is a nonionic surfactant that is a fatty acid ester having a freezing point of lower than −15° C. and having a cyclic structure.

3 Claims, No Drawings

COOLANT COMPOSITION

CROSS-REFERENCE TO RELATED APPLICATION

This application claims priority to Japanese Patent Application No. 2022-148580 filed on Sep. 16, 2022 incorporated herein by reference in its entirety.

BACKGROUND

1. Technical Field

The disclosure relates to a coolant composition.

2. Description of Related Art

Japanese Unexamined Patent Application Publication No. 59-124995 (JP 59-124995 A) discloses a water-containing lubricant in which a surfactant is added to a lubricant to disperse water.

SUMMARY

The water-containing lubricant disclosed in JP 59-124995 A is more flame-retardant than a typical oil type lubricant, and thus there is a demand for the water-containing lubricant. On the other hand, the water-containing lubricant needs to be fluent even at a very low temperature, for example, for use as a coolant in an electrified vehicle. In the water-containing lubricant or a water-containing cutting oil, water can be dispersed in the oil even when water is mixed by dew condensation or the like. However, the water-containing lubricant or the water-containing cutting oil is used at normal temperature or higher in many cases and does not focus on the freezing point of the surfactant. Therefore, in a very low temperature environment, the total fluidity is lost due to solidification of the surfactant and cannot function as a coolant. In a lubricant not including a surfactant, when water is mixed by dew condensation or the like, water and the oil are separated from each other. Therefore, an electrical current flows in the water portion, and there is a possibility that desired insulating properties cannot be maintained.

The disclosure provides a coolant composition that can maintain insulating properties even when water is mixed and can also maintain fluidity even in a very low temperature environment.

An aspect of the disclosure relates to a coolant composition includes a mineral oil or a synthetic oil and a surfactant. A conductivity of the coolant composition is lower than 0.1 μS/cm. The surfactant is a nonionic surfactant that is a fatty acid ester having a freezing point of lower than −15° C. and having a cyclic structure.

As a result, by adding the surfactant to the oil, the coolant composition according to the disclosure is uniformly emulsified even when water is mixed, such that water and the oil are not separated from each other. Therefore, water is not present independently, and insulating properties can be maintained. Further, in the coolant composition according to the disclosure, by selecting a surfactant having a freezing point of lower than −15° C. as the surfactant, the fluidity can be maintained even in a very low temperature environment, and a coolant composition suitable for a coolant usage environment can be obtained.

In the coolant composition according to the aspect, the fatty acid ester may be sucrose fatty acid ester, sorbitan monooleate, or sorbitan sesquioleate. An alkyl group of the fatty acid ester may have a linear or branched structure.

As a result, as the surfactant, a surfactant that is a nonionic surfactant and is a fatty acid ester having a freezing point of lower than −15° C. and having a cyclic structure can be used.

In the coolant composition according to the aspect, the conductivity of the coolant composition may be lower than 0.0009 μS/cm.

The coolant composition according to the aspect may further include one or more selected from an antioxidant, a rust inhibitor, a viscosity index improver, a pour point depressant, a dispersant, a surface active agent, an antiwear additive, a defoamer, or an antistatic fluid.

In the coolant composition according to the aspect, a viscosity of the coolant composition may be 10 mm²/s or lower at 40° C.

The coolant composition according to the aspect may further include water.

The coolant composition according to the disclosure can maintain insulating properties even when water is mixed and can also maintain fluidity even in a very low temperature environment.

DETAILED DESCRIPTION OF EMBODIMENTS

Hereinafter, an embodiment of a coolant composition according to the disclosure will be described. The disclosure is not limited to the embodiment.

The coolant composition according to the embodiment is applied to a coolant, such as a battery, an inverter, an oil cooler, or a radiator that is provided in, for example, an electrified vehicle, and has excellent insulating properties and excellent cooling performance.

The coolant composition according to the embodiment includes a mineral oil or a synthetic oil and a surfactant. A conductivity of the coolant composition according to the embodiment is lower than 0.1 μS/cm. The surfactant is a nonionic surfactant that is a fatty acid ester having a freezing point of lower than −15° C. and having a cyclic structure. The fatty acid ester is, for example, sucrose fatty acid ester, sorbitan monooleate, or sorbitan sesquioleate. An alkyl group of the fatty acid ester has a linear or branched structure.

For example, even when water is mixed by dew condensation or the like during use in an electrified vehicle, the coolant composition according to the embodiment is uniformly emulsified by emulsification of the surfactant to be included, such that water and the oil are not separated from each other. Therefore, water is not present independently, and desired insulating properties can be maintained. The desired insulating properties are insulating properties in which, for example, when a coolant leaks during an accident or the like of an electrified vehicle, short-circuit caused by contact with the coolant and a battery terminal can be suppressed. In the coolant composition according to the embodiment, for example, the conductivity of the coolant composition is lower than 0.1 μS/cm, such that the desired insulating properties can be obtained. The conductivity of the coolant composition is more preferably lower than 0.0009 μS/cm.

The coolant composition according to the embodiment may include a desired additives other than the surfactant. As the additive, for example, one or more selected from an antioxidant, a rust inhibitor, a viscosity index improver, a pour point depressant, a dispersant, a surface active agent, an antiwear additive, a defoamer, or an antistatic fluid can be used.

When the coolant composition according to the embodiment is used for forced convection using a pump or the like, it is preferable to set a viscosity of the coolant composition at 40° C. to 10 mm²/s or lower. At this time, the viscosity of the coolant composition may be adjusted, for example, by decreasing the viscosity of the mineral oil or by adjusting the content [mass %] of the mineral oil to be included.

Hereinafter, the embodiment will be described in more detail using Examples.

Adjustment Method

Coolant compositions according to Examples 1 to 3 and Comparative Examples 1 to 8 were prepared by mixing materials according to compositions shown in Tables 1 and 2 below.

Example 1

In Example 1, 90 mass % of a mineral oil as a base oil, 5 mass % of sucrose fatty acid ester as a surfactant, and 5 mass % of water were mixed to prepare a coolant composition. The freezing point of the sucrose fatty acid ester is lower than −15° C.

Example 2

In Example 2, 90 mass % of a mineral oil as a base oil, 5 mass % of sorbitan monooleate as a surfactant, and 5 mass % of water were mixed to prepare a coolant composition. The freezing point of the sorbitan monooleate is lower than −15° C.

Example 3

In Example 3, 90 mass % of a mineral oil as a base oil, 5 mass % of sorbitan sesquioleate as a surfactant, and 5 mass % of water were mixed to prepare a coolant composition. The freezing point of the sorbitan sesquioleate is lower than −15° C.

Comparative Example 1

In Comparative Example 1, 95 mass % of a mineral oil as a base oil and 5 mass % of water were mixed to prepare a coolant composition.

Comparative Example 2

In Comparative Example 2, 90 mass % of a mineral oil as a base oil, 5 mass % of C8/C10 triglyceride as a surfactant, and 5 mass % of water were mixed to prepare a coolant composition. The freezing point of the C8/C10 triglyceride is −15° C. or higher.

Comparative Example 3

In Comparative Example 3, a coolant composition containing 100 mass % of LLC (TOYOTA genuine coolant, trade name: SUPER LONG COOLANT, containing ethylene glycol and an additive) was used.

Comparative Example 4

In Comparative Example 4, 90 mass % of a mineral oil as a base oil, 5 mass % of octylamine as a surfactant, and 5 mass % of water were mixed to prepare a coolant composition. The freezing point of the octylamine is −15° C. or higher.

Comparative Example 5

In Comparative Example 5, 90 mass % of a mineral oil as a base oil, 5 mass % of polyoxyalkylene lauryl ether as a surfactant, and 5 mass % of water were mixed to prepare a coolant composition. The freezing point of the polyoxyalkylene lauryl ether is −15° C. or higher.

Comparative Example 6

In Comparative Example 6, 90 mass % of a mineral oil as a base oil, 5 mass % of polyoxypropylene glycol monoalkyl ether as a surfactant, and 5 mass % of water were mixed to prepare a coolant composition. The freezing point of the polyoxypropylene glycol monoalkyl ether is −15° C. or higher.

Comparative Example 7

In Comparative Example 7, 90 mass % of a mineral oil as a base oil, 5 mass % of sodium dodecyl sulfate (anionic) as a surfactant, and 5 mass % of water were mixed to prepare a coolant composition. The freezing point of the sodium dodecyl sulfate (anionic) is −15° C. or higher.

Comparative Example 8

In Comparative Example 8, 90 mass % of a mineral oil as a base oil, 5 mass % of dodecyl trimethyl ammonium chloride (cationic) as a surfactant, and 5 mass % of water were mixed to prepare a coolant composition. The freezing point of the dodecyl trimethyl ammonium chloride (cationic) is −15° C. or higher.

Conductivity

Regarding the conductivities of the coolant compositions according to the Examples 1 to 3 and Comparative Examples 1 to 8, the conductivity of each of the coolant compositions having a temperature was adjusted to 20° C. was measured using (manufactured by Yokogawa Electric Corporation, PERSONAL SC METER SC72, detector: SC72SN-11). The evaluation results are shown in Tables 1 and 2 below.

−15° C. Viscosity

Regarding the −15° C. viscosities of the coolant compositions according to the Examples 1 to 3 and Comparative Examples 1 to 8, each of the coolant compositions having a temperature adjusted to −15° C. was put into a Cannon-Fenske viscometer to measure the kinetic viscosity. The evaluation results are shown in Tables 1 and 2 below.

TABLE 1

| Item | | Item Details | Example 1 | Example 2 | Example 3 | Comparative Example 1 | Comparative Example 2 | Comparative Example 3 |
|---|---|---|---|---|---|---|---|---|
| Composition [mass %] | | Mineral Oil | 90 | 90 | 90 | 95 | 90 | |
| | Surfactant | Sucrose Fatty Acid Ester | 5 | | | | | |

|

TABLE 1-continued

| Item | Item Details | | Example 1 | Example 2 | Example 3 | Comparative Example 1 | Comparative Example 2 | Comparative Example 3 |
|---|---|---|---|---|---|---|---|---|
| | | Sorbitan Monooleate | | 5 | | | | |
| | | Sorbitan Sesquioleate | | | 5 | | | |
| | | C8/C10 Triglyceride | | | | | 5 | |
| | | Water | 5 | 5 | 5 | 5 | 5 | |
| | | LLC | | | | | | 100 |
| | Total [mass %] | | 100 | 100 | 100 | 100 | 100 | 100 |
| Performance | Conductivity | A: lower than 0.0009 [μm/cm] B: lower than 0.1 [μm/cm] C: 0.1 [μm/cm] | A | A | A | C | A | A |
| | −15 [° C.] Viscosity | A: lower than 40 [mm²/s] B: lower than 70 [mm²/s] C: Not Measurable | A | A | A | C | C | C |
| | Emulsifiability of Water in Oil | A: Emulsifiable B: Non-Emulsifiable | A | A | A | B | A | B |

TABLE 2

| Item | Item Details | | Comparative Example 4 | Comparative Example 5 | Comparative Example 6 | Comparative Example 7 | Comparative Example 8 |
|---|---|---|---|---|---|---|---|
| Composition [mass %] | | Mineral Oil | 90 | 90 | 90 | 90 | 90 |
| | Surfactant | Octylamine | 5 | | | | |
| | | Polyoxyalkylene Lauryl Ether | | 5 | | | |
| | | Polyoxypropylene Glycol Monoalkyl Ether | | | 5 | | |
| | | Sodium Dodecyl Sulfate (Anionic) | | | | 5 | |
| | | Dodecyl Trimethyl Ammonium Chloride (Cationic) | | | | | 5 |
| | | Water LLC | 5 | 5 | 5 | 5 | 5 |
| | Total [mass %] | | 100 | 100 | 100 | 100 | 100 |
| Performance | Conductivity | A: lower than 0.0009 [μm/cm] B: lower than 0.1 [μm/cm] C: 0.1 [μm/cm] | A | A | A | A | A |
| | −15 [° C.] Viscosity | A: lower than 40 [mm²/s] B: lower than 70 [mm²/s] C: Not Measurable | C | C | C | C | C |
| | Emulsifiability of Water in Oil | A: Emulsifiable B: Non-Emulsifiable | B | B | B | B | B |

In all of the coolant compositions according to Examples 1 to 3, the conductivity was lower than 0.0009 μS/cm, and the insulating properties were excellent. The −15° C. viscosity of the coolant composition according to Example 1 was 39 mm²/s. The −15° C. viscosity of the coolant composition according to Example 2 was 33 mm²/s. The −15° C. viscosity of the coolant composition according to Example 3 was 35 mm²/s. That is, in all of the coolant compositions according to Examples 1 to 3, the −15° C. viscosity was lower than 40 mm²/s, and the fluidity was also excellent in a very low temperature environment of −15° C. In all of the coolant compositions according to Examples 1 to 3, the emulsifiability of water in the oil is emulsifiable. Therefore, for example, even when water is mixed by dew condensation or the like during use in an electrified vehicle, the coolant composition is uniformly emulsified, such that water and the oil are not separated from each other. Therefore, water is not present independently, and desired insulating properties can be maintained.

On the other hand, in the coolant composition according to Comparative Example 1, the conductivity was 0.2 μS/cm, which was 0.1 μS/cm or higher. Therefore, desired insulating properties were insufficient. In the coolant composition according to Comparative Example 1, water was solidified, the −15° C. viscosity was not measurable, and the fluidity in a very low temperature environment of −15° C. was insufficient. The coolant composition according to Comparative Example 1 does not include a surfactant. Therefore, the emulsifiability of water in the oil is non-emulsifiable, water and the oil are separated, and water is present independently. For example, when water is mixed by dew condensation or the like during use in an electrified vehicle, desired insulating properties cannot be maintained.

In the coolant composition according to Comparative Example 2, the conductivity was lower than 0.0009 μS/cm, and the insulating properties were excellent. In the coolant composition according to Comparative Example 2, the emulsifiability of water in the oil is emulsifiable. For example, even when water is mixed by dew condensation or the like during use in an electrified vehicle, desired insulating properties can be maintained. In the coolant composition according to Comparative Example 2, the surfactant was solidified, the −15° C. viscosity was not measurable, and the fluidity in a very low temperature environment of −15° C. was insufficient.

In the coolant composition according to Comparative Example 3, the conductivity was lower than 0.0009 μS/cm, and the insulating properties were excellent. However, in the coolant composition according to Comparative Example 2, water was solidified, the −15° C. viscosity was not measurable, and the fluidity in a very low temperature environment of −15° C. was insufficient. The coolant composition according to Comparative Example 3 does not include a surfactant. Therefore, the emulsifiability of water in the oil is non-emulsifiable, water and the oil are separated, and water is present independently. For example, when water is mixed by dew condensation or the like during use in an electrified vehicle, an electrical current flows in the water portion that is separated from the oil and is present independently, and desired insulating properties cannot be maintained.

In all of the coolant compositions according to Comparative Examples 4 to 8, the conductivity was lower than 0.0009 μS/cm, and the insulating properties were excellent. However, even in all of the coolant composition according to Comparative Example 4 to 8, water was solidified, the −15° C. viscosity was not measurable, and the fluidity in a very low temperature environment of −15° C. was insufficient. Even in the coolant compositions according to Comparative Examples 4 to 8, the emulsifiability of water in the oil is non-emulsifiable, water and the oil are separated, and water is present independently. For example, when water is mixed by dew condensation or the like during use in an electrified vehicle, an electrical current flows in the water portion that is separated from the oil and is present independently, and desired insulating properties cannot be maintained.

It was verified from the above results that, in the coolant composition according to the embodiment (the coolant compositions according to Examples 1 to 3), the insulating properties are excellent, for example, even when water is mixed by dew condensation or the like during use in an electrified vehicle, desired insulating properties can be maintained, and the fluidity can be maintained even in a very low temperature environment.

What is claimed is:

1. A coolant composition comprising:

90 mass % of a mineral oil as a base oil;

5 mass % of a sucrose fatty acid ester as a nonionic surfactant, wherein the sucrose fatty acid ester has a freezing point of less than −15° C. and a cyclic structure, and wherein an alkyl group of the fatty acid ester has a linear or branched structure; and 5 mass % of water, wherein the mass % is based on a total mass of the mineral oil, the sucrose fatty acid ester and the water, wherein an electrical conductivity of the coolant composition is lower than 0.0009 μS/cm, and a viscosity of the coolant composition at −15° C. is less than 40 mm$^2$/s.

2. The coolant composition according to claim 1, further comprising one or more selected from an antioxidant, a rust inhibitor, a viscosity index improver, a pour point depressant, a dispersant, a surface active agent, an antiwear additive, a defoamer, or an antistatic fluid.

3. The coolant composition according to claim 1, wherein a viscosity of the coolant composition is 10 mm$^2$/s or lower at 40° C.

\* \* \* \* \*